W. S. SMITH.
VALVE.
APPLICATION FILED NOV. 14, 1916.

1,283,581.

Patented Nov. 5, 1918.

INVENTOR
BY *Walter S. Smith*

*Robt. P. Hains*
ATTORNEY

UNITED STATES PATENT OFFICE.

WALTER S. SMITH, OF FOXBORO, MASSACHUSETTS, ASSIGNOR TO THE PLUMBING SERVICE COMPANY, OF BOSTON, MASSACHUSETTS, A CORPORATION.

VALVE.

1,283,581.

Specification of Letters Patent.

Patented Nov. 5, 1918.

Application filed November 14, 1916. Serial No. 131,331.

*To all whom it may concern:*

Be it known that I, WALTER S. SMITH, a citizen of the United States, residing at Foxboro, in the county of Norfolk and State of Massachusetts, have invented an Improvement in Valves, of which the following description, in connection with the accompanying drawings, is a specification, like characters on the drawings representing like parts.

This invention relates to valves for water heaters and other purposes.

In the use of hot water tanks for domestic and other purposes, it frequently happens that the hot water is drawn therefrom more rapidly than the cold water is admitted thereto. This is likely to create a partial vacuum therein, so that the pressure outside of the tank will be much greater than the pressure in the same. Consequently, dangerous strains may be set up which will be likely to injure or rupture the tank. To relieve this pressure, vacuum valves have been used, but they have been found to be leaky, short-lived, slowly responsive to pressure variations, and otherwise unsatisfactory.

The present invention aims to overcome the objections to the valves formerly used. One object of the invention is to provide a diaphragm valve which will have a smaller area effective in closing than in opening the valve. Another object is to provide a valve seat for the diaphragm valve which may be readily removed for purposes of cleaning and repair, without disturbing the diaphragm valve or other parts. Another object is to provide means to press against and urge the diaphragm valve to its seat. Still another object is to provide an improved reinforced diaphragm valve.

The character of the invention may be best understood by reference to the following description of an embodiment thereof shown in the accompanying drawing, wherein:—

Figure 1:
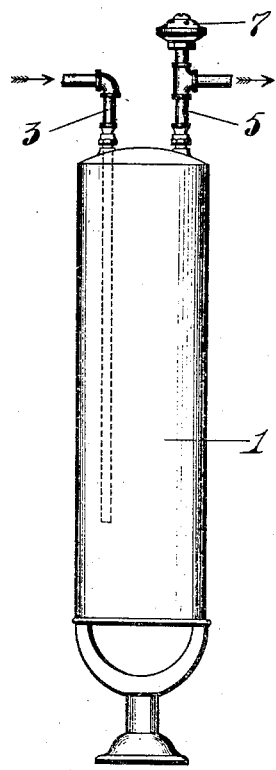
Figure 2:
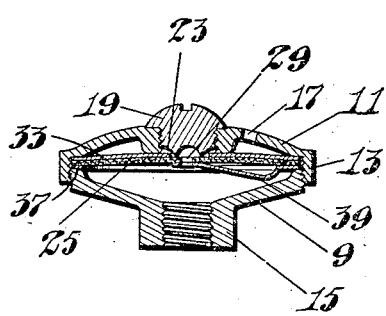
Figure 3:
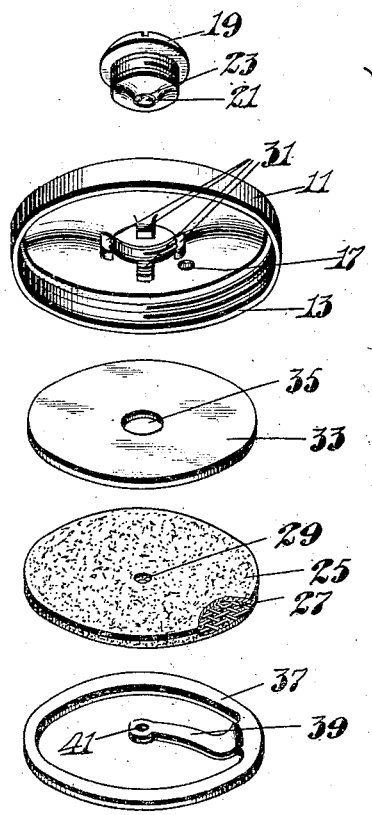

Figure 1 is a side elevation of a hot water tank equipped with a valve embodying the invention;

Fig. 2 on an enlarged scale is a vertical section through the valve shown in Fig. 1; and Fig. 3 shows perspective views of the parts of the valve unassembled.

Referring to the drawings: 1 designates a hot water tank such as is commonly used for heating water for domestic purposes. This tank is provided with an inlet pipe 3 for delivering cold water to the tank and an outlet pipe 5 for discharging water from the tank. A valve 7 embodying the invention is conveniently connected to said discharge pipe.

Referring now more particularly to Figs. 2 and 3: this valve comprises a casing conveniently consisting of a base 9 and a cap 11 having a flange 13 threaded to said base. The base has a neck 15 tapped for connection with the outlet pipe. The cap has a small opening 17 communicating with the outside atmosphere.

A plug 19 may be threaded in said cap and may have a screw head for facilitating the insertion and removal thereof. The inner end of said plug has a central depression 21 bounded by a circumferential rim forming a valve seat 23.

Coöperating with this valve seat is a diaphragm 25 of rubber or other suitable material, and preferably reinforced by wire netting 27 incorporated therein to contribute to the life and elasticity thereof. The surface of the diaphragm may be coated with graphite to protect and prevent the same from sticking against the valve seat. A small port 29 at the center of the diaphragm is provided preferably smaller than the valve seat so that the margin of the diaphragm surrounding said port may rest against said seat.

When the diaphragm is bulged downward from said seat, the fluid may enter the cap opening 17 and pass the valve seat through the diaphragm port, and thence through the neck 15 into the tank. When the diaphragm is bulged upward, as shown, it will contact with said seat and prevent escape of fluid from the tank.

The under face of the diaphragm is exposed to the high pressures of the tank, whereas the upper face of the diaphragm is exposed to the low pressure of the atmosphere outside of the tank. The diaphragm should be freely responsive to both high and low pressures at all times, but without injurious distortion from the high pressures.

To provide such a diaphragm, stop means may be provided for said diaphragm shown in the present instance of the invention in the form of a series of lugs 31 projecting from and integral with the cap of the casing and located at the margin of the plug aperture a short distance from the valve seat.

These lugs may have their inner faces threaded to the valve seat plug and contribute to the strength of the connection of the latter with the cap of the casing.

A backing diaphragm 33 of metal or other suitable material may be interposed between said valve diaphragm and said stop lugs and may have a central port 35 somewhat larger than said valve seat.

When the pressure in the tank causes the diaphragm to commence to bulge upward, the backing diaphragm will engage said stop lugs and the latter will limit the further movement thereof. The central area of the valve diaphragm within the boundary of said stop lugs will flex on inward toward and to said valve seat. This central area being smaller and stiffer than the area of the diaphragm as a whole, will be able to withstand the high pressure without injurious distortion or permanent set. On the contrary, the diaphragm will retain its life and flexibility so that it can always be relied upon to perform its duty.

When the pressure in the tank falls below the pressure of the atmosphere outside of the tank, the air entering the cap opening 17 will act on the entire area of the diaphragm and promptly open the valve.

To contribute to the holding of the valve diaphragm on its seat, a ring 37 may be provided having a finger 39 projecting radially inward therefrom and provided with a head having an aperture 41 registering with the port in said diaphragm. This finger may be of resilient material so that it will constantly tend to press the diaphragm to its seat. However, this finger is sufficiently light to permit the diaphragm to readily move away from its seat in response to atmospheric pressure thereon.

If the pressure in the tank falls so that it substantially equals the atmospheric pressure, or drops somewhat beneath the latter pressure, the spring finger will hold the diaphragm against its seat and prevent leakage of fluid from the tank. Obviously, a pressure in the tank slightly less than atmospheric pressure will not strain or injure the same.

The diaphragm and finger ring may be clamped in superposed relation between opposed circumferential shoulders on said base and cap.

There are important advantages in the valve described. It is reliably responsive to atmospheric pressure outside of the tank when the pressure in the tank falls substantially beneath the atmospheric pressure. Thus, it will be certain to admit air into the tank to prevent the occurrence of any dangerous partial vacuum therein. On the other hand, it is strong and will reliably withstand the high pressures in the tank and prevent escape of fluid therefrom. The plug carrying the valve seat may be readily unscrewed from the cap of the casing to permit the cleaning of said seat without removing said cap from its base or disturbing the diaphragm. The valve may be placed in any position. It will operate equally well whether its diaphragm be vertically or horizontally disposed. The valves of this nature experience extreme temperature changes and sometimes are permitted to remain idle for long periods of time when the water is shut off from the tank. The valve described will not objectionably dry, warp, or stiffen, but on the contrary, will retain its shape, will not stick to its seat, and is always in readiness for operation.

While the valve has been described herein more particularly in connection with its use for a hot water tank for domestic purposes, it is adapted for many other uses as desired.

It will be understood that the invention is not limited to the specific embodiment shown, but that extensive deviations may be made therefrom without departing from the spirit and scope of the claims.

What is claimed is:—

1. The combination with a casing, of a valve and its seat, a diaphragm in said casing for opening and closing said valve and having a port therein, openings in said casing for admitting fluid pressure to opposite sides of said diaphragm to flex the latter and effect opening and closing of said valve, and stop means acting on said diaphragm intermediate said port and the outer edge of said diaphragm for confining the final valve closing flexion thereof to its area between said stop means and port.

2. The combination with a casing, of a valve and its seat, a diaphragm in said casing for opening and closing said valve, openings in said casing for admitting fluid pressure to opposite sides of said diaphragm to flex the latter and effect opening and closing of said valve, and means for rendering a smaller area of said diaphragm responsive to pressure to finally close the valve than to open said valve.

3. The combination with a casing having an opening therein, a detachable member projecting into said opening, a diaphragm in said casing, valve means having parts carried by said member and diaphragm, respectively, means to admit fluid pressure into said casing at opposite sides of said diaphragm to open and close said valve means, and stop means coöperating with said diaphragm for rendering a smaller area thereof effective in finally closing than in opening said valve means.

4. The combination with a casing, of a diaphragm therein, valve means operated by said diaphragm, means to admit fluid pressure to opposite sides of said diaphragm to open and close said valve means, stop means coöperating with said diaphragm for rendering a greater area thereof effective in opening than in finally closing said valve means, and a light spring finger tending to close said valve means.

5. The combination with a casing, of a diaphragm having a port therein, valve means operated by said diaphragm, means to admit fluid pressure to opposite sides of said diaphragm to open and close said valve means, stop means for rendering a greater area of said diaphragm effective in opening than in finally closing said valve means, and a diaphragm interposed between said valve operating diaphragm and said stop means and having a port larger than the port of said valve operating diaphragm.

6. The combination with a casing, of a diaphragm therein, valve means operated by said diaphragm, means to admit fluid pressure to opposite sides of said diaphragm to open and close said valve means, and means to render a greater area of said diaphragm effective in opening than in finally closing said valve means.

7. The combination with a casing, of a diaphragm therein, valve means operated by said diaphragm, means to admit fluid pressure to opposite sides of said diaphragm to open and close said valve means, and stop means coöperating with said diaphragm for rendering a greater area of said diaphragm effective in opening than in finally closing said valve means.

8. The combination with a casing, of a valve seat, stop means, a diaphragm having a port larger than said seat and limited by said stop means, and a diaphragm having a smaller port and presenting a surface for engagement with said seat.

In testimony whereof, I have signed my name to this specification.

WALTER S. SMITH.

Witnesses:
HENRY T. WILLIAMS,
BEATRICE I. SMITH.

Copies of this patent may be obtained for five cents each, by addressing the "Commissioner of Patents, Washington, D. C."